US011959432B2

(12) United States Patent
Wang et al.

(10) Patent No.: US 11,959,432 B2
(45) Date of Patent: *Apr. 16, 2024

(54) EXHAUST VALVE FAILURE DIAGNOSTICS AND MANAGEMENT

(71) Applicant: Tula Technology, Inc., San Jose, CA (US)

(72) Inventors: Robert C. Wang, San Jose, CA (US); Louis J. Serrano, Los Gatos, CA (US); Shikui Kevin Chen, Leander, TX (US)

(73) Assignee: Tula Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,362

(22) Filed: Mar. 8, 2023

(65) Prior Publication Data

US 2023/0220810 A1 Jul. 13, 2023

Related U.S. Application Data

(63) Continuation of application No. 17/569,722, filed on Jan. 6, 2022, now Pat. No. 11,624,335.

(Continued)

(51) Int. Cl.

| | |
|---|---|
| ***F02D 41/22*** | (2006.01) |
| ***F02D 13/02*** | (2006.01) |

(Continued)

(52) U.S. Cl.

CPC ....... *F02D 41/221* (2013.01); *F02D 13/0242* (2013.01); *F02D 13/06* (2013.01);

(Continued)

(58) Field of Classification Search

CPC .. F02D 41/221; F02D 41/0087; F02D 41/009; F02D 41/1454; F02D 41/1489;

(Continued)

(56) References Cited

U.S. PATENT DOCUMENTS

| | | | |
|---|---|---|---|
| 4,434,767 | A | 3/1984 | Kohama et al. |
| 4,489,695 | A | 12/1984 | Kohama et al. |

(Continued)

FOREIGN PATENT DOCUMENTS

| | | |
|---|---|---|
| CN | 1204003 | 1/1999 |
| DE | 10 2006 050597 | 7/2007 |

(Continued)

OTHER PUBLICATIONS

International Search Report and Written Opinion dated Apr. 27, 2022 from International Application No. PCT/US2022/011337.

(Continued)

*Primary Examiner* — Hai H Huynh

(74) *Attorney, Agent, or Firm* — Beyer Law Group LLP

(57) ABSTRACT

A method of operating an engine is provided. An exhaust valve actuation fault is detected for a first exhaust valve associated with a first cylinder during a first working cycle. In response to the detection of the exhaust valve actuation fault, fueling to at least the first cylinder is cut off. Actuation of the first exhaust valve is attempted in second working cycles that follow the first working cycle, wherein the second working cycles are not fueled. Whether or not the first exhaust valve actuated properly during the second working cycles is determined. Operation of the first cylinder is resumed when it is determined that the first exhaust valve actuated properly. Operation of the first cylinder is not resumed when it is determined that the first exhaust valve did not actuate properly.

9 Claims, 3 Drawing Sheets

Related U.S. Application Data

(60) Provisional application No. 63/136,090, filed on Jan. 11, 2021.

(51) Int. Cl.
*F02D 13/06* (2006.01)
*F02D 41/00* (2006.01)

(52) U.S. Cl.
CPC ....... *F02D 41/0087* (2013.01); *F02D 41/009* (2013.01); *F02D 2200/0406* (2013.01)

(58) Field of Classification Search
CPC .... F02D 41/021; F02D 13/0242; F02D 13/06; F02D 13/0203; F02D 2200/0406; F02D 2200/503
USPC ....... 123/399, 90.11, 90.15, 198 F, 481, 479, 123/480; 701/103–105, 107; 73/114.69
See application file for complete search history.

(56) References Cited

U.S. PATENT DOCUMENTS

| | | | |
|---|---|---|---|
| 4,509,488 | A | 4/1985 | Forster et al. |
| 5,041,976 | A | 8/1991 | Marko et al. |
| 5,200,898 | A | 4/1993 | Yuhara et al. |
| 5,278,760 | A | 1/1994 | Ribbens et al. |
| 5,355,713 | A | 10/1994 | Scourtes et al. |
| 5,377,631 | A | 1/1995 | Schechter |
| 5,377,720 | A | 1/1995 | Stobbs et al. |
| 5,433,107 | A | 7/1995 | Angermaier et al. |
| 5,490,486 | A | 2/1996 | Diggs |
| 5,537,963 | A | 7/1996 | Hasebe et al. |
| 5,581,022 | A | 12/1996 | Sprague et al. |
| 5,584,281 | A | 12/1996 | Katoh |
| 5,721,375 | A | 2/1998 | Bidner |
| 5,734,100 | A | 3/1998 | Kishimoto et al. |
| 5,753,804 | A | 5/1998 | La Palm et al. |
| 5,774,823 | A | 6/1998 | James et al. |
| 5,790,757 | A | 8/1998 | Meijer |
| 5,796,261 | A | 8/1998 | Golab |
| 5,803,040 | A | 9/1998 | Biesinger et al. |
| 5,826,563 | A | 10/1998 | Patel et al. |
| 6,006,155 | A | 12/1999 | Wu et al. |
| 6,006,157 | A | 12/1999 | Dai et al. |
| 6,023,651 | A | 2/2000 | Nakayama et al. |
| 6,158,411 | A | 12/2000 | Morikawa |
| 6,382,175 | B1 | 5/2002 | Van der Staay et al. |
| 6,431,154 | B1 | 8/2002 | Inoue |
| 6,439,176 | B1 | 8/2002 | Payne et al. |
| 6,457,353 | B1 | 10/2002 | Kanke et al. |
| 6,494,087 | B2 | 12/2002 | Hatano et al. |
| 6,564,623 | B2 | 5/2003 | Zanetti |
| 6,584,951 | B1 | 7/2003 | Patel et al. |
| 6,591,666 | B1 | 7/2003 | Kacewicz et al. |
| 6,615,776 | B1 | 9/2003 | Von Andrian-Werburg |
| 6,619,258 | B2 | 9/2003 | McKay et al. |
| 6,655,353 | B1 | 12/2003 | Rayl |
| 6,691,021 | B2 | 2/2004 | Takagi et al. |
| 6,752,004 | B2 | 6/2004 | Inada et al. |
| 6,752,121 | B2 | 6/2004 | Rayl et al. |
| 6,782,865 | B2 | 8/2004 | Rayl et al. |
| 6,801,848 | B1 | 10/2004 | Mathews |
| 7,025,035 | B1 | 4/2006 | Duty et al. |
| 7,063,062 | B2 | 6/2006 | Lewis et al. |
| 7,066,136 | B2 | 6/2006 | Ogiso |
| 7,086,386 | B2 | 8/2006 | Doering |
| 7,171,929 | B2 | 2/2007 | Dosdall et al. |
| 7,234,442 | B2 | 6/2007 | Hanson et al. |
| 7,257,482 | B2 | 8/2007 | Yasui |
| 7,314,034 | B1 | 1/2008 | Waters et al. |
| 7,357,019 | B2 | 4/2008 | Mc Donald |
| 7,395,813 | B2 | 7/2008 | Pagot |
| 7,484,484 | B2 | 2/2009 | Frincke et al. |
| 7,490,001 | B2 | 2/2009 | Izelfanane |

| | | | |
|---|---|---|---|
| 7,503,296 | B2 | 3/2009 | Rozario et al. |
| 7,503,312 | B2 | 3/2009 | Surnilla et al. |
| 7,546,827 | B1 | 6/2009 | Wade et al. |
| 7,577,511 | B1 | 8/2009 | Tripathi et al. |
| 7,595,971 | B2 | 9/2009 | Ganev et al. |
| 7,757,657 | B2 | 7/2010 | Albertson et al. |
| 7,762,237 | B2 | 7/2010 | Gibson et al. |
| 7,819,096 | B2 | 10/2010 | McConville et al. |
| 7,854,215 | B2 | 12/2010 | Rozario et al. |
| 7,900,509 | B2 | 3/2011 | Feldkamp et al. |
| 7,908,913 | B2 | 3/2011 | Cinpinski et al. |
| 7,918,210 | B2 | 4/2011 | Gibson et al. |
| 7,921,709 | B2 | 4/2011 | Doering et al. |
| 7,930,087 | B2 | 4/2011 | Gibson et al. |
| 7,942,039 | B2 | 5/2011 | Huber et al. |
| 7,946,262 | B2 | 5/2011 | Borraccia et al. |
| 8,006,670 | B2 | 8/2011 | Rollinger et al. |
| 8,091,412 | B2 | 1/2012 | Forte et al. |
| 8,099,224 | B2 | 1/2012 | Tripathi et al. |
| 8,103,433 | B2 | 1/2012 | Hartmann et al. |
| 8,181,508 | B2 | 3/2012 | Cinpinski et al. |
| 8,286,471 | B2 | 10/2012 | Doering et al. |
| 8,301,362 | B2 | 10/2012 | Buslepp et al. |
| 8,511,281 | B2 | 8/2013 | Tripathi et al. |
| 8,550,055 | B2 | 10/2013 | Ferch et al. |
| 8,601,862 | B1 | 12/2013 | Bowman et al. |
| 8,631,688 | B1 | 1/2014 | Rayl et al. |
| 8,666,641 | B2 | 3/2014 | Rollinger et al. |
| 8,667,835 | B2 | 3/2014 | Doering et al. |
| 8,826,891 | B2 | 9/2014 | Nishikiori et al. |
| 8,931,255 | B2 | 1/2015 | Wilson et al. |
| 9,086,020 | B2 | 7/2015 | Tripathi et al. |
| 9,175,613 | B2 | 11/2015 | Parsels et al. |
| 9,212,610 | B2 | 12/2015 | Chen et al. |
| 9,399,963 | B2 | 7/2016 | Loucks et al. |
| 9,399,964 | B2 | 7/2016 | Younkins et al. |
| 9,523,319 | B2 | 12/2016 | Wilson et al. |
| 9,562,470 | B2 | 2/2017 | Younkins et al. |
| 9,581,098 | B2 | 2/2017 | Chen et al. |
| 9,587,567 | B2 | 3/2017 | Zhang et al. |
| 9,650,923 | B2 | 5/2017 | Parsels et al. |
| 9,784,644 | B2 | 10/2017 | Chen et al. |
| 9,890,732 | B2 | 2/2018 | Younkins et al. |
| 10,072,592 | B2 | 9/2018 | Younkins et al. |
| 10,088,388 | B2 | 10/2018 | Chen et al. |
| 10,816,438 | B2 | 10/2020 | Chen et al. |
| 11,125,175 | B2 | 9/2021 | Chen et al. |
| 11,143,575 | B2 | 10/2021 | Chen |
| 11,326,534 | B2 | 5/2022 | Chen et al. |
| 2001/0047792 | A1 | 12/2001 | Akazaki et al. |
| 2002/0121252 | A1 | 9/2002 | Payne et al. |
| 2003/0213445 | A1 | 11/2003 | Bloms et al. |
| 2005/0033501 | A1 | 2/2005 | Liu et al. |
| 2005/0150561 | A1 | 7/2005 | Flynn et al. |
| 2005/0199220 | A1 | 9/2005 | Ogiso |
| 2006/0129307 | A1 | 6/2006 | Yasui |
| 2007/0101959 | A1 | 5/2007 | Soejima |
| 2007/0113803 | A1 | 5/2007 | Froloff et al. |
| 2008/0060427 | A1 | 3/2008 | Hoshi et al. |
| 2008/0092836 | A1 | 4/2008 | Mutti et al. |
| 2008/0236267 | A1 | 10/2008 | Hartmann et al. |
| 2008/0243364 | A1 | 10/2008 | Sun et al. |
| 2009/0099755 | A1 | 4/2009 | Harbert |
| 2009/0158830 | A1 | 6/2009 | Malaczynski et al. |
| 2009/0254242 | A1 | 10/2009 | Kweon et al. |
| 2010/0031738 | A1 | 2/2010 | Feldkamp et al. |
| 2010/0050993 | A1 | 3/2010 | Zhao et al. |
| 2010/0106458 | A1 | 4/2010 | Leu et al. |
| 2010/0154738 | A1 | 6/2010 | Tsukamoto et al. |
| 2010/0175463 | A1 | 7/2010 | Doering et al. |
| 2010/0286891 | A1 | 11/2010 | Huang et al. |
| 2010/0288035 | A1 | 11/2010 | Arakawa |
| 2011/0072893 | A1 | 3/2011 | Malacznski |
| 2012/0109495 | A1 | 5/2012 | Tripathi et al. |
| 2012/0143471 | A1 | 6/2012 | Tripathi et al. |
| 2012/0173122 | A1 | 7/2012 | Nishikiori et al. |
| 2012/0285161 | A1 | 11/2012 | Kerns et al. |
| 2012/0310505 | A1 | 12/2012 | Morgan et al. |
| 2013/0000752 | A1 | 1/2013 | Saito et al. |

(56) References Cited

U.S. PATENT DOCUMENTS

| | | | |
|---|---|---|---|
| 2013/0325290 | A1 | 12/2013 | Pierik |
| 2014/0041624 | A1 | 2/2014 | Rayl et al. |
| 2014/0332705 | A1 | 6/2014 | Stubbs |
| 2014/0261317 | A1 | 9/2014 | Loucks et al. |
| 2015/0075458 | A1 | 3/2015 | Parsels et al. |
| 2015/0218978 | A1 | 8/2015 | Kubani et al. |
| 2016/0281617 | A1 | 9/2016 | Batal et al. |
| 2017/0002761 | A1 | 1/2017 | Dudar |
| 2017/0101956 | A1 | 4/2017 | Younkins et al. |
| 2017/0218866 | A1 | 8/2017 | Shost et al. |
| 2017/0370804 | A1 | 12/2017 | Chen et al. |
| 2019/0234323 | A1 | 8/2019 | Weber et al. |
| 2020/0263617 | A1 | 8/2020 | Hashimoto et al. |
| 2021/0003088 | A1 | 1/2021 | Chen et al. |
| 2022/0205398 | A1 | 6/2022 | Chen et al. |
| 2022/0220919 | A1 | 7/2022 | Wang et al. |

FOREIGN PATENT DOCUMENTS

| | | |
|---|---|---|
| DE | 10 2007 040117 | 2/2009 |
| DE | 10 2008 011614 | 6/2011 |
| EP | 1069298 | 1/2001 |
| JP | 2000-248982 | 9/2000 |
| JP | 2010-174857 | 8/2010 |
| JP | 2011-99338 | 5/2011 |
| JP | 2011-179432 | 9/2011 |
| KR | 10-2017-0125590 | 11/2017 |
| WO | WO 2010/006311 | 1/2010 |
| WO | WO 2011/085383 | 7/2011 |

OTHER PUBLICATIONS

Cybenko, "Approximation by Superpositions of a Sigmoidal Function", Mathematics of Control, Signals, and Systems, (1989) 2: 303-314.

Hinton et al., "Deep Neural Networks for Acoustic Modeling in Speech Recognition", Signal Processing Magazine, IEEE, 29(6): 8297, 2012a, Apr. 27, 2012.

Krizhevsky et al., "ImageNet Classification with Deep Convolutional Neural Networks", https://papers.nips.cc/paper/4824-imagenet-classification-with-deep-convolutional-neural-networks.pdf, Jan. 2012.

Weston et al., "Towards AI-Complete Question Answering: A Set of Prerequisite Toy Tasks", ICLR, Dec. 31, 2015.

Glorot et al., "Understanding the Difficulty of Training Deep Feedforward Neural Networks", In Proceedings of AISTATS 2010, vol. 9, pp. 249256, May 2010.

Wilcutts et al., "Design and Benefits of Dynamic Skip Fire Strategies for Cylinder Deactivated Engines", SAE Int. J. Engines, 6(1): 2013, doi: 10.4271/2013-01-0359, Apr. 8, 2013.

Serrano et al., "Methods of Evaluating and Mitigating NVH When Operating an Engine in Dynamic Skip Fire", SAE Int. J. Engines 7(3): 2014, doi: 10.4271/2014-01-1675, Apr. 1, 2014.

Liu et al., "Standards Compliant HIL Bench Development for Dynamic Skip Fire Feature Validation", SAE Technical Paper 2015-01-0171, 2015, Apr. 14, 2015.

Chen et al., "Misfire Detection in a Dynamic Skip Fire Engine", SAE Int. J. Engines 8(2): 389-398, 2015, Apr. 14, 2015.

Chien et al., "Modeling and Simulation of Airflow Dynamics in a Dynamic Skip Fire Engine", SAE Technical Paper 2015-01-1717, Apr. 14, 2015.

Eisazadeh-Far et al., "Fuel Economy Gains Through Dynamic-Skip-Fire in Spark Ignition Engines", SAE Technical Paper 2016-01-0672, Jul. 20, 2015.

Wilcutts et al., "eDSF: Dynamic Skip Fire Extension to Hybrid Powertrains", Aachen Colloquium China Automobile and Engine Technology 2017.

Ortiz-Soto et al., "DSF: Dynamic Skip Fire with Homogeneous Lean Burn for Improved Fuel Consumption, Emissions and Drivability", SAE Technical Paper 2018-01-1891, Apr. 3, 2018.

Chen et al., "Machine Learning for Misfire Detection in a Dynamic Skip Fire Engine", SAE Technical Paper 2018-01-1158, Apr. 3, 2018.

Chen et al., "Dynamic Skip Fire Applied to a Diesel Engine for Improved Fuel Consumption and Emissions", Presented at the 4. Int. Conf. Diesel Powertrains 3.0, Jul. 3-4, 2018.

Younkins et al., "Advances in Dynamic Skip Fire: eDSF and mDSF", 27th Aachen Colloquium Automobile and Engine Technology, 2018.

Younkins et al., "Dynamic Skip Fire: New Technologies for Innovative Propulsion Systems", General Motors Global Propulsion Systems, 39th International Vienna Motor Symposium, Apr. 2018.

Younkins et al., "Dynamic Skip Fire: The Ultimate Cylinder Deactivation Strategy", 29th Edition of the SIA Powertrain Congress, Versailles, Jun. 7-8, 2017.

Asik et al., "Transient A/F Estimation and Control Using a Neural Network", SAE Technical Paper 970619, 1997 (SP-1236), 1997.

Kalogirou et al., "Development of an Artificial Neural Network Based Fault Diagnostic System of an Electric Car", Design and Technologies for Automotive Safety-Critical Systems, SAE Technical Paper 2000-011055, 2000 (SP-1507), Mar. 6-9, 2000.

Wu et al., "Misfire Detection Using a Dynamic Neural Network with Output Feedback", Electronic Engine Controls 1998: Diagnostics and Controls, SAE Technical Paper 980515, 1998 (SP-1357), Feb. 23-26, 1998.

Nareid et al., "Detection of Engine Misfire Events Using an Artificial Neural Network", Electronic Engine Controls, SAE Technical Paper 2004-01-1363, 2004 (SP-1822), Mar. 8-11, 2004.

Kirkham et al., "Misfire Detection Including Confidence Indicators Using a Hardware Neural Network", Electronic Engine Controls, SAE Technical Paper, 2006-11-1349, 2006 (SP-2003), Apr. 3-6, 2006.

Merkisz et al., "Overview of Engine Misfire Detection Methods Used in On Board Diagnostics", Journal of Kones Combustion Engines, vol. 8, No. 1-2, 2001.

Chatterjee et al., "Comparison of Misfire Detection Technologies on Spark- ignition Engines for Meeting On-Board Diagnostic Regulation", 2013 SAE International, doi: 10 4271/2013-01-2884, Nov. 27, 2013.

Bue et al., "Misfire Detection System Based on the Measure of Crankshaft Angular Velocity", Advanced Microsystems for Automotive Applications, 2007, pp. 149-161.

Baghi Abadi et al., "Single and Multiple Misfire Detection in Internal Combustion Engines Using Vold-Kalman Filter Order-Tracking", SAE Technical Paper 2011-01-1536, 2011, doi: 10,4271/2011-01-1536, May 17, 2011.

Shiao et al., "Cylinder Pressure and Combustion Heat Release Estimation for SI Engine Diagnostics Using Nonlinear Sliding Observers", IEEE Transactions on Control Systems Technology, vol. 3. No. 1, Mar. 1995.

Ball et al., "Torque Estimation and Misfire Detection Using Block Angular Acceleration", SAE Technical Paper 2000-01-0560, Mar. 6-9, 2000.

Abu-Mostafa et al., "Learning From Data", AMLbook.com, ISBN 10:1 60049 006 9, ISBN 13:978 1 60049 006 4, Chapter 7, 2012.

Pedregosa et al., "Scikit-Learn: Machine Learning in Python", Journal of Machine Learning Research, 12 (2011) 2825-2830, Oct. 2011.

Tan, "Fourier Neural Networks and Generalized Single Hidden Layer Networks in Aircraft Engine Fault Diagnostics", Journal of Engineering for Gas Turbines and Power, Oct. 2006, vol. 128, pp. 773-782.

U.S. Appl. No. 17/860,838, filed Jul. 8, 2022.

International Search Report and Written Opinion dated Nov. 16, 2022 for International Application No. PCT/US2022/036574.

EXHAUST VALVE FAILURE DIAGNOSTICS AND MANAGEMENT

CROSS-REFERENCE TO RELATED APPLICATION

This application is a Continuation of U.S. application Ser. No. 17/569,722, filed on Jan. 6, 2022 which claims the benefit of priority of U.S. Application No. 63/136,090, filed Jan. 11, 2021, both of which are incorporated herein by reference for all purposes.

BACKGROUND

The present disclosure relates generally to the identification and management of exhaust valve activation faults.

SUMMARY

To achieve the foregoing and in accordance with the purpose of the present disclosure, a variety of engine controllers and engine control methods are described. In one aspect, in response to the detection of an exhaust valve actuation fault associated with a first cylinder, fueling to at least the first cylinder is cut off. Actuation of the faulting exhaust valve is attempted in a set of one or more second working cycles that follows the faulting (first) working cycle in the faulting cylinder, wherein the one or more second working cycles are not fueled. For each of the one or more second working cycles, whether the first exhaust valve actuated properly during the set of one or more second working cycles is determined. Operation of the first cylinder is resumed when it is determined that the first exhaust valve actuated properly during the set of one or more second working cycles. Operation of the first cylinder is not resumed when it is determined that the first exhaust valve did not actuate properly during the set of one or more second working cycles. If the exhaust valve is controlled as part of a group of exhaust valves, then fuel may be cut off to all of the cylinders associated with all of the exhaust valves in the group of exhaust valves. The group of exhaust valves may include all of the exhaust valves of the engine.

In another aspect, in response to the detection of an exhaust valve actuation fault, fueling to an associated first cylinder is cut off. Actuation of the faulting exhaust valve is attempted in a set of one or more engine cycles that follows the faulting working cycle, wherein the faulting cylinder is not fueled during the one or more engine cycles. An electric motor is utilized to maintain at least one of a desired drive torque and a desired crankshaft rotation speed during the one or more engine cycles. Whether or not to resume operation of the first cylinder is desired is based at least in part on whether at least some of the attempts to actuate the first exhaust valve in the set of one or more engine cycles are successful.

In another aspect, a controller for controlling an engine is provided where in response to the detection of an exhaust valve actuation fault, fueling to at least a first cylinder associated to the faulting exhaust valve is cut off. An attempt to actuate the faulting exhaust valve is made in a set of one or more second working cycles that follows the first working cycle. If the faulting valve works properly operation of the first cylinder is resumed. If the first exhaust valve did not actuate properly during the set of one or more second working cycles, then operation of the first cylinder is not resumed.

These and other features of the present disclosure will be described in more detail below in the detailed description and in conjunction with the following figures.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF THE EMBODIMENTS

Figure 1:
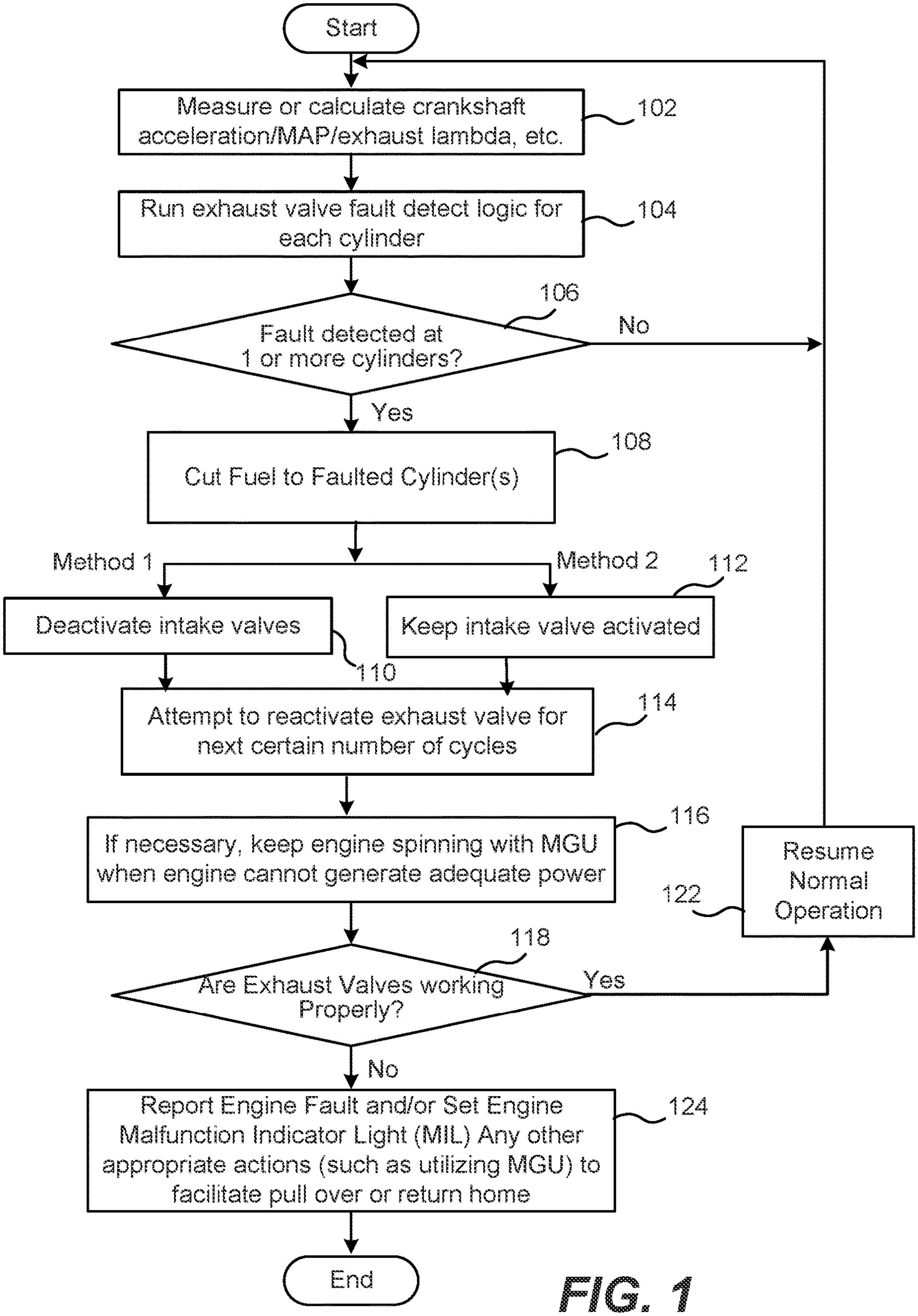
FIG. 1 is a high level flow chart of an embodiment.

There are a number of internal combustion engine control technologies that contemplate deactivating and subsequently reactivating an engine's intake and/or exhaust valves. For example, Applicant has extensively described dynamic skip fire engine control in which cylinders are selectively skipped or fired. The intake and/or exhaust valves are typically deactivated during skipped working cycles so that air is not pumped through the associated cylinder. There are a number of different valve deactivation technologies. Some contemplate individually deactivating/reactivating intake and exhaust valves, while others contemplate deactivating/reactivating valves in groups—as for example deactivating/reactivating the intake valve(s) and exhaust valve(s) associated with a single cylinder as a group, or deactivating/reactivating a set of exhaust valves or a set of intake valves as a group. A group of intake valves may include all intake valves of the engine. A group of exhaust valves may include all of the exhaust valves of the engine. The variations in valve actuation technologies leads to a variety of different potential failure modes in which one or more of the valves may fail to reactivate when desired.

The applicant has described a number of techniques for detecting valve actuation faults. By way of example, U.S. Pat. Nos. 9,562,470; 9,650,923, 9,890,732, and 11,143,575 (each of which is incorporated herein by reference in its entirety) describe a number of exhaust valve actuation fault detection techniques. For example, one suitable method for detecting exhaust valve actuation faults is based on monitoring angular acceleration of the crankshaft. During the exhaust stroke of a fired working cycle with the valves working properly, it is expected that a small negative torque will be applied to the crankshaft by the piston associated with the exhausting cylinder. In contrast, if the exhaust valve fails to actuate during an exhaust stroke after a cylinder has been fired, the hot combustion gases will be compressed during the exhaust stroke resulting in a much stronger negative torque on the crankshaft with there being a measurable difference from the expected crankshaft acceleration during the exhaust stroke. The detection of such a differential between the actual crankshaft acceleration and the expected crankshaft acceleration can be used to identify exhaust valve actuation faults.

A variety of other technologies can be used to help detect valve actuation faults. For example, if an intake valve opens after the failed exhaust valve opening, the high pressure compressed gases within the cylinder will exhaust into the intake manifold. This creates a high pressure pulse having a characteristic signature within the intake manifold that can also be readily detected thereby identifying both that the exhaust valve failed to open, and that the intake valve did open. Conversely, if no high pressure pulse is detected in the intake manifold after the detection of a post cylinder firing exhaust valve actuation failure, that provides strong evidence that the intake valve has also not actuated. There are a variety of other technologies that can be used to detect valve actuation faults and several such technologies are described in some of the incorporated patents.

Once an exhaust valve actuation fault is identified, it can be helpful to manage the operation of the engine and/or an associated powertrain or drive train in specific ways to help mitigate adverse impacts of such faults, especially if such faults reoccur. A few management schemes that are particularly well adapted to handling exhaust valve deactivation faults will be described. Some embodiments are described in the context of skip fire engine operations in which cylinders may be selectively fired or deactivated during selected working cycles. Other embodiments described herein are applicable to handling exhaust valve activation faults regardless of whether the engine is operating in a skip fire or other operating mode.

Figure 2:
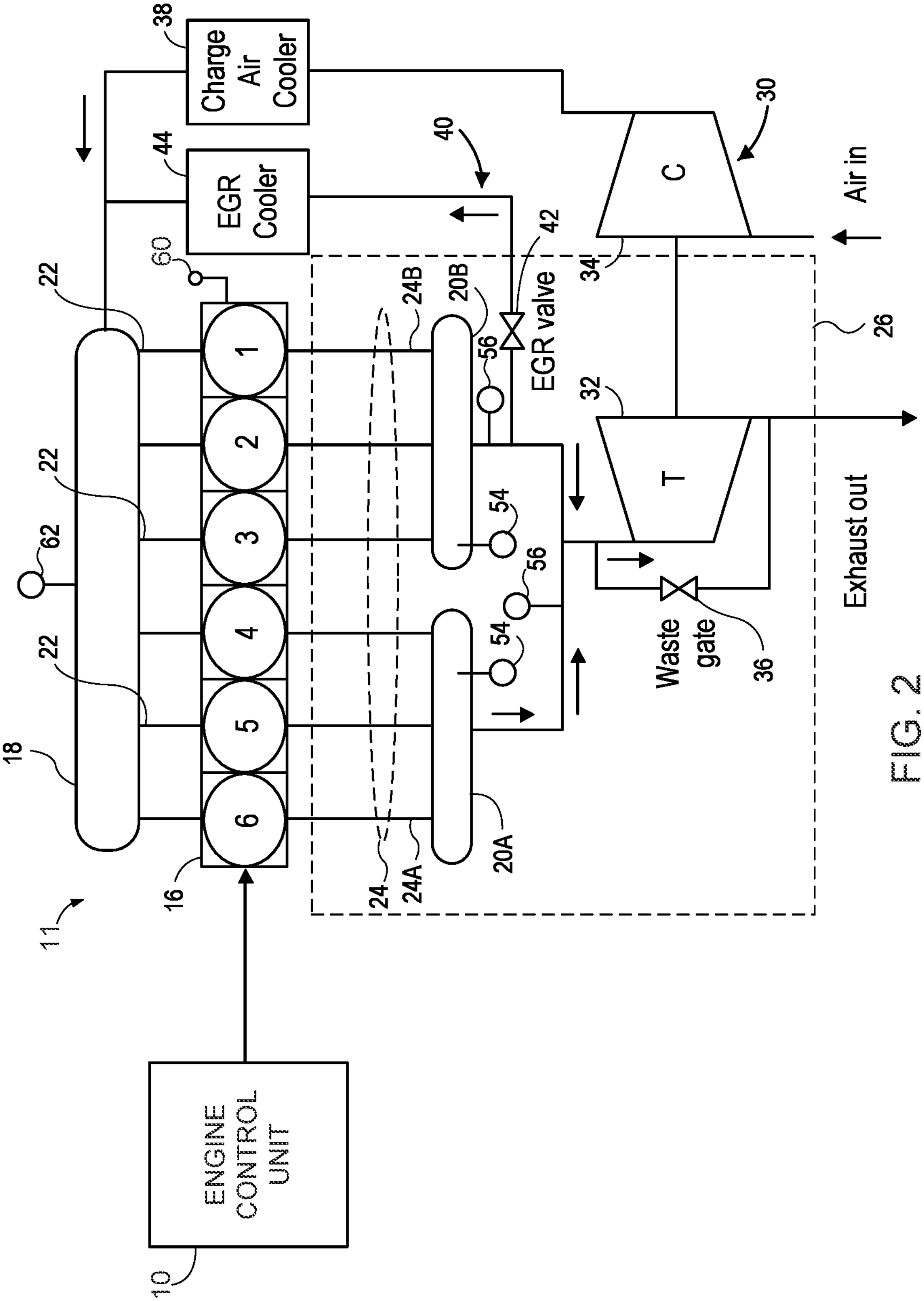
FIG. 2 is a schematic illustration of an engine system that may be used in an embodiment.

FIG. 2 is a schematic illustration of an engine system 11 in the form of an internal combustion engine 16 controlled by an engine control unit (ECU) 10 that may be used in an embodiment. The internal combustion engine has six in-line cylinders or working chambers, which in an alternative may be placed in a V6 configuration, labeled in the drawing 1, 2, 3, 4, 5 and 6, respectively. With six cylinders, six air input runners 22 are provided between the air intake manifold 18 and each of the six cylinders, respectively. The individual air input runners 22 are provided to supply air and potentially other gases for combustion from the intake manifold 18 to the individual cylinders through intake valves. In the particular embodiment shown, two exhaust manifolds 20A and 20B are provided to direct combusted gases from the cylinders through exhaust valves to an exhaust system 26. In particular, three exhaust runners 24A are provided between cylinders 6, 5 and 4 and the first of the two exhaust manifolds 20A and an additional three exhaust runners 24B are provided between the cylinders 3, 2 and 1 and the second of the two exhaust manifolds 20B. The exhaust manifolds 20A and 20B both exhaust to the exhaust system 26. Although a specific engine configuration is shown, it should be appreciated that the invention can be used in conjunction with a wide variety of different engine configurations.

Figure 3:
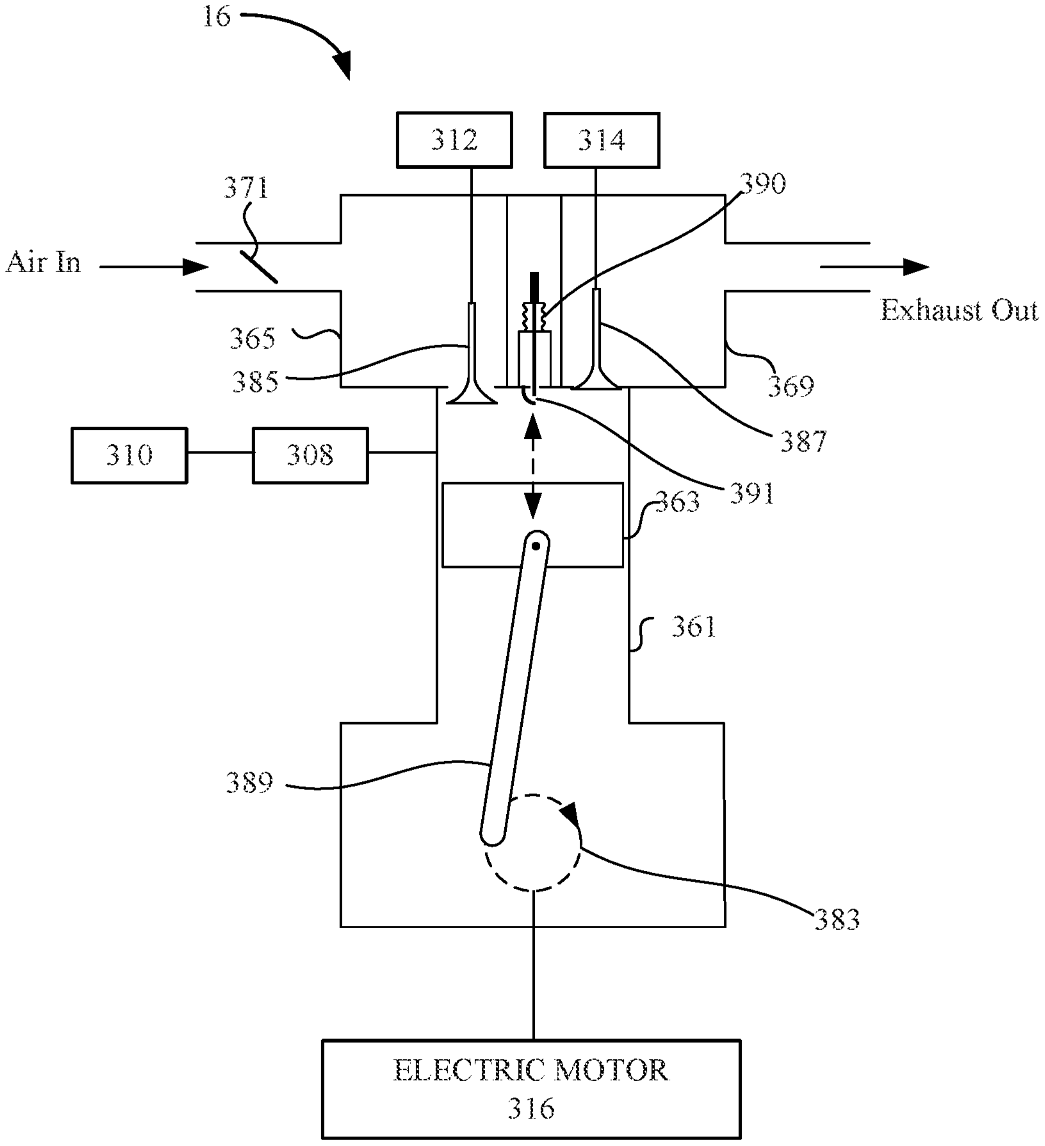
FIG. 3 illustrates a schematic cross-sectional view of part of the internal combustion engine.

FIG. 3 illustrates a schematic cross-sectional view of part of a spark ignition internal combustion engine 16 that includes a cylinder 361, a piston 363, an intake manifold 365, spark plug 390, and spark gap 391 and an exhaust manifold 369. The throttle valve 371 controls the inflow of air into the intake manifold 365. Air is inducted from the intake manifold 365 into cylinder 361 through an intake valve 385. Fuel is added to this air either by port injection or direct injection into the cylinder 361 from a fuel source 308, which is controlled by a fuel controller 310. Combustion of the air/fuel mixture is initiated by a spark present in the spark gap 391. Expanding gases from combustion increase the pressure in the cylinder and drive the piston 363 down. Reciprocal linear motion of the piston is converted into rotational motion by a connecting rod 389, which is connected to a crankshaft 383. Combustion gases are vented from cylinder 361 through an exhaust valve 387. The intake valve 385 in an embodiment is controlled by an intake valve controller 312. The exhaust valve 387 in an embodiment is controlled by an exhaust valve controller 314. In an embodiment, an electric motor 316 is connected to and is able to rotate the crankshaft 383. The electric motor 316 may be a starter motor or an electric motor used to provide a hybrid vehicle. In some embodiments, the ECU 10 may control the fuel controller 310, the intake valve controller 312, the exhaust valve controller 314, and the electric motor 316. In some embodiments, the fuel controller 310 may be part of the ECU 10. Although a spark ignition engine is shown, it should be appreciated that the invention is equally applicable to compression ignition engines, including diesel engines.

Turning to FIG. 1, during operation of the engine system 11, the ECU 10 or other suitable controller monitors a number of sensors that provide information useful in identifying valve actuation faults as represented by block 102. For example, a crankshaft rotation sensor 60 that measures the rotational speed of the crankshaft and can be used to determine crankshaft acceleration or any other higher-order time derivatives thereof (such as crankshaft jerk.) An intake manifold pressure sensor 62 measures the pressure in the intake manifold 18. Exhaust manifold pressure sensors 54 measure the pressure in the exhaust manifolds 20A, 20B. Exhaust gas oxygen sensors (e.g., lambda sensors (k-sensors)) 56 measure the oxygen in the exhaust. Measurement output from one or more of the intake manifold pressure sensor 62, the exhaust manifold pressure sensors 54, exhaust gas oxygen sensors 56, an exhaust valve proximity sensor, and/or other sensors as may be available for any particular engine may be used to identify exhaust valve actuation faults. For each expected exhaust valve actuation or deactivation event, exhaust valve fault detection logic determines whether the corresponding exhaust valve has performed as expected as represented by analysis block 104 and decision block 106. If no fault is detected, the logic of blocks 102-106 repeats as represented by the “No” branch from decision block 106.

When a fault is detected (the “Yes” branch from decision block 106) specific actions may be taken to mitigate the impact of the fault. Initially fuel delivery to the faulting cylinder(s) is prevented in the next and subsequent working cycles (block 108) at least until the problem has been resolved. Preventing fueling of the following working cycle(s) mitigates the risk of the faulting cylinder causing any problems. For example, if the exhaust valve fault continues in one or more following working cycles in the faulting cylinder while the intake valve opens and fueling is performed in the regular course, the exhaust gases would be vented back into the intake manifold disrupting the engine’s operation and risking overheating of the intake manifold.

Regardless of the intake valve management scheme chosen, an attempt is made to reactivate the exhaust valve for the faulting cylinder(s) in the next and, if/as necessary, subsequent following working cycles as represented by block 114. In general, an attempt is made to reactivate the faulting exhaust valve(s) in the next working cycle(s) without fueling or firing the associated cylinder(s). A successful reactivation of the exhaust valve can be detected in a variety of manners. For example, in some implementations the torque signature associated with the exhaust stroke (as reflected by the crankshaft acceleration) is used to identify that the exhaust valve has indeed actuated. When a faulting cylinder contains a high pressure exhaust spring, the difference in the torque signatures between a venting exhaust stroke and a non-venting exhaust stroke will be significant and are easily detectable. Even when the intake valve has been opened such that the faulting cylinder effectively holds an air spring, there is a non-trivial difference in the torque signatures of a vented vs. a non-vented exhaust stroke that can be detected via analysis of the crankshaft acceleration.

More generally, the torque signature associated with any intake or exhaust stroke (and often the torque signatures associated with compression and expansion as well) will vary based on whether an associated intake or exhaust valve was actuated or not. As such, crankshaft acceleration measurements can be used to determine whether a valve has opened (or not opened) as directed/expected during the testing period.

Additionally or alternatively, data from a k-sensor (or other oxygen sensor) 56 can be used to determine or help determine whether an exhaust valve has opened. For example, when an intake valve(s) is opened during test working cycles in the testing period, intake manifold air will be introduced into the cylinder during the intake stroke. If/when the corresponding exhaust valve(s) opens, the air charge in the cylinder will be expelled into the exhaust system. The passing air charge passing the k-sensor 56 can be expected to have much more oxygen in it than other exhaust gases and will be readily identifiable in the k-sensor 56 data providing another mechanism for determining or verifying whether the exhaust valve has been opened as instructed.

In another specific example, when the intake valve(s) is opened during the testing period, an intake manifold absolute pressure (MAP) sensor 62 can also be used to determine whether the exhaust valve has opened during test working cycles. Specifically, if the air charge in the cylinder is not vented to the exhaust system during the exhaust stroke, it will vent back into the intake manifold 18 when the intake valve is opened. This results in a pressure rise within the intake manifold 18 which will be detected by the MAP sensor 62.

These various tests and others can be used individually or in any combination and/or in combination with any other suitable valve actuation detection technology to determine whether the exhaust valve(s) have been opened as instructed during the testing period. The crankshaft rotation sensor 60, MAP sensor 62, and k-sensor 56 are mentioned specifically because many current commercially available engines already include such sensors and thus the exhaust valve actuations faults and testing faults can be detected without requiring additional hardware modifications to the engine and their associated costs. However, it should be appreciated that when other suitable sensors are available, such as exhaust manifold pressure sensors 54 and exhaust valve proximity sensors, they can readily be used in combination with and/or in place of any of the mentioned sensors.

If the exhaust valves are determined to be working properly in the test period (the "Yes" branch of block 118), normal engine operation (e.g., normal skip fire operation) may be resumed (block 122). Alternatively, if the exhaust valve(s) are determined not to be functioning properly for any reason, appropriate remedial actions may be taken as represented by block 124. The appropriate remedial actions may vary based on the nature of the fault. Typical remedial actions may include reporting an engine or valve actuation fault to an engine diagnostics log, setting an engine malfunction indicator light (MIL), disabling the faulting cylinder(s), and operating using only the remaining "good" cylinders, etc.

Individual Exhaust Valve Control

In an embodiment, each cylinder can be individually controlled. In an example, if it is determined that the exhaust valve for cylinder 4 is malfunctioning, at decision block 106, then fuel to cylinder 4 is cut (block 108). In one embodiment, the intake valve for cylinder 4 is also deactivated (block 110). In another embodiment, the intake valve for cylinder 4 is kept active (block 112). In this example, the other five active cylinders provide sufficient power to keep the engine spinning (block 116). The sensors 60, 62, 54, and 56 may be used to help to determine if the exhaust valves are working properly. In particular, the system determines whether or not the exhaust valve for cylinder 4 is properly working. If it is determined that the exhaust valve for cylinder 4 is working properly at block 118, then normal operation is resumed at block 122. If after several engine cycles it is determined that the exhaust valve for cylinder 4 is not working properly at block 118, then a malfunction is indicated, and other appropriate actions may be taken at block 124. In an embodiment, a check engine light may be illuminated, and the error may be reported to the ECU 10, fuel remains cut off from cylinder 4, and the engine is powered without cylinder 4.

In some embodiments, a cylinder individual valve control system may have skip fire control. The skip fire control may be provided by the ECU 10 or may be provided by other systems. In this example, cylinder 4 is removed from the skip fire sequence. In such an embodiment, the skip fire controller is arranged to alter the firing sequence so that the desired engine torque can be delivered without significantly impacting the engine's performance or even being noticeable to a driver.

Bank Exhaust Valve Control

In another embodiment, the cylinders are controlled as part of a bank (or group) of cylinders. In an example, cylinders 4, 5, and 6 form a first bank of cylinders, with exhaust valves connected to a first exhaust manifold 20A, and cylinders 1, 2, and 3 form a second bank of cylinders, with exhaust valves connected to a second exhaust manifold 20B. If it is determined that the exhaust valve for cylinder 4 is malfunctioning, at decision block 106, then fuel to the bank of cylinders 4, 5, and 6 is cut (block 108). In one embodiment, the intake valves for cylinders 4, 5, and 6 are also deactivated (block 110). In another embodiment, the intake valves for cylinders 4, 5, and 6 are kept active (block 112). In this example, the other bank of cylinders 1, 2, and 3 provide sufficient power to keep the engine spinning (block 116). If it is determined that the exhaust valve for cylinder 4 is working properly at block 118, then normal operation of all cylinders is resumed at block 122. If after several engine cycles it is determined that the exhaust valve for cylinder 4 is not working properly at block 118, then a malfunction is indicated, and other appropriate actions may be taken at block 124. In an embodiment, a check engine light may be illuminated, and the error may be reported to the ECU 10 and the engine remains powered by only the second bank of cylinders 1, 2, and 3, while fuel is cut off from cylinders 4, 5, and 6.

Exhaust Valve Control of all Exhaust Valves

In another embodiment, the engine system has a single exhaust valve controller to control all of the exhaust valves. In such an embodiment, the group of exhaust valves is all exhaust valves of the engine, and the group of associated cylinders is all cylinders in the engine. Such engine systems may have only three or four cylinders. Such engine systems may have more than four cylinders. If it is determined that an exhaust valve is malfunctioning, at decision block 106, then fuel to all of cylinders is cut (block 108). In one embodiment, the intake valves for all of the cylinders are also deactivated (block 110). In another embodiment, the intake valves for the cylinders are kept active (block 112). In this example, the momentum allows the engine to continue to spin for one or more engine cycles (block 116). If it is determined that exhaust valves are working properly at block 118, then normal operation of all cylinders is resumed at block 122. If it is determined that the exhaust valves are not working properly at block 118, then a malfunction is indicated, and other appropriate actions may be taken at block 124. In an embodiment, a check engine light may be illuminated, and the error may be reported to the ECU 10 and the engine system is stopped.

Hybrid Embodiments

Hybrid powertrains facilitate a number of other potential actions that may be used in various embodiments. For example, if one or more cylinders are deactivated due to exhaust valve actuation faulting, a motor/generator unit (MGU) can supply some of the power necessary to operate as appropriate. Depending on the nature of the fault and the number of cylinders that are suffering exhaust valve actuation faults, this could be supplying power to facilitate safely pulling to the side of the road or returning home or to an appropriate workshop. In addition, the electric motor may be used to rotate the engine in order to test the exhaust valve, while fuel to the associated cylinder or group of cylinders is cut off.

Some hybrid powertrain systems may have minimum battery state of charge limits or maximum power draw limits, so that electricity storage devices such as batteries or capacitors have enough power to start the engine. In some embodiments, when all or some of the cylinders are deactivated and the motor is needed to move the vehicle, the system may allow the violation of the minimum battery state of charge limits and/or maximum power draw limits in order to provide enough power to the electric motor to move the vehicle to a safe location, such as the side of a road, home, or an appropriate workshop, as part of the appropriate action at block 124.

In another embodiment, where one or more, but not all of the cylinders are deactivated, the motor may be used to provide additional torque. The combination of the engine and the motor may be used to maintain a desired speed or may provide a reduced speed that is sufficient to move the vehicle to safety. In some embodiments, where the fuel is not cut to all cylinders, the system may allow the violation of minimum battery state of charge limits and/or maximum power draw limits.

Alternative Embodiments

In various embodiments, the period for the deactivation of the intake valves can vary based on the needs of any particular implementation. In some embodiments, the intake valves will remain deactivated throughout a testing period, which may continue until the activation fault has been resolved. In other embodiments, the intake valves may be deactivated for a designated testing period—e.g., a designated number of working cycles or a designated period of time. In some implementations, it is desirable to deactivate the intake valve(s) associated with the faulting cylinder(s) immediately (i.e., for the next working cycle(s) in such cylinder(s) so that the combustion gases do not vent back into the intake manifold). This approach is particularly valuable in implementations where the intake valves are not guaranteed to be robust enough to withstand the intake valves opening into the very high pressure exhaust gases that are present in a cylinder that has been fired, but not exhausted. A potential drawback of this approach is that when both the intake and exhaust valves are held closed, a high-pressure exhaust spring may be created in the faulting cylinder which can reduce engine performance.

In other embodiments, it may be desirable to keep the intake valves associated with the faulting cylinder(s) active so that they open each working cycle thereby venting and re-venting the associated cylinders throughout the testing period as represented by block 112. This allows the exhaust gases to vent into the intake manifold during the first "intake" stroke and effectively eliminates the high pressure spring. The cylinder then effectively re-intakes each subsequent working cycle. In still other embodiments, other desired combinations of re-intake and holding the intake valve(s) closed during sequential test period working cycles can be used.

The engine designer may have wide latitude in defining what level of verification is required to return to normal operations. In many cases, normal operations may be resumed as soon as the faulting exhaust valve has been determined to have opened properly. In others circumstances it may be desirable to require that the faulting exhaust valve(s) operate properly over two or more engine cycles before normal operation is resumed. In some embodiments, if an exhaust valve actuation fault occurs intermittently at a high frequency, an ECU may be programmed to keep the associated cylinder deactivated. In such an embodiment, logic may be provided so that if an exhaust valve actuation fault is detected a threshold number of times within a specified time period, then the associated valve is deactivated, and fueling of the cylinder is cut off until there is a repair or reset. In an alternative embodiment, logic may be provided so that if an exhaust valve actuation fault is detected a threshold number of times within a specified period, and the actuation fault is resolved a threshold number of times within a specified period, then the exhaust valve is kept active and is never deactivated until there is a repair or reset.

In various embodiments, the exhaust system 26 may include any number of various aftertreatment systems, including but not limited to a Diesel particulate filter, a Selective Catalytic Reduction (SCR) system, a Diesel Exhaust Fluid (DEF) system and/or a NOx trap which are generally used for Diesel or lean burn internal combustion engines and/or a three-way catalytic converter, which is typically used for a gasoline-fueled, spark ignition, internal combustion engine.

It should be understood that the particular configuration of the internal combustion engine 16, the intake manifold 18 and the two manifolds exhaust manifolds 20A and 20B is merely exemplary. In actual embodiments, the number of cylinders or banks and the number and/or arrangement of the cylinders may widely vary. For example, the number of cylinders may range from one to any number, such as 3, 4, 6, 8, 12 or 16 or more. Also, the cylinders may be arranged in-line as shown, in a V configuration, in multiple cylinder banks, etc. The internal combustion engine may be a Diesel engine, a lean burn engine, a gasoline-fueled engine, a spark ignition engine, or a multi-fuel engine. The engine may also use any combination of ignition source, fuel-stratification, air/fuel stoichiometry, or combustion cycle. Also, on the exhaust side, varying numbers of exhaust manifolds may be used, ranging from just one shared by all cylinders or multiple exhaust manifolds.

In some embodiments, the internal combustion engine 16 can optionally be equipped with either or both a turbocharger 30 and/or an Exhaust Gas Recirculation (EGR) system 40. The turbocharger 30 is used to boost the pressure in the intake manifold 18 above atmospheric pressure. With boosted air, the internal combustion engine 16 can generate more power compared to a naturally aspirated engine because more air, and proportionally more fuel, can be input into the individual cylinders.

The optional turbocharger 30 includes a turbine 32, a compressor 34, a waste gate valve 36 and an air charge cooler 38. The turbine 32 receives combusted exhaust gases from one or more of the exhaust manifold(s) 20A and/or 20B. In situations where more than two exhaust manifolds are used, their outputs are typically combined to drive the turbine 32. The exhaust gases passing through the turbine drives the compressor 34, which in turn, boosts the pressure of air provided to the air charge cooler 38. The air charge cooler 38 is responsible for cooling the compressed air to a desired temperature or temperature range before re-circulating back into the air intake manifold 18.

In some optional embodiments, a waste gate valve 36 may be used. By opening the waste gate valve 36, some or all of the combusted exhaust gases from the exhaust manifold(s) 20 can bypass the turbine 32. As a result, the back-pressure supplied to the fins of the turbine 32 can be controlled, which in turn, controls the degree to which the compressor 34 compresses the input air eventually supplied to the intake manifold 18.

In various non-exclusive embodiments, the turbine 32 may use a variable geometry subsystem, such as a variable vane or variable nozzle turbocharger system. In which case, an internal mechanism (not shown) within the turbine 32 alters a gas flow path through the fins of the turbine to optimize turbine operation as the exhaust gas flow rate through the turbine changes. If the turbine 32 is part of a variable geometry or variable nozzle turbocharger system, the waste gate 36 may not be required.

The EGR system 40 includes an EGR valve 42 and an EGR cooler 44. The EGR valve 42 is fluidly coupled to one or more of the exhaust manifolds 20A and/or 20B and is arranged to provide a controlled amount of the combusted exhaust gases to the EGR cooler 44. In turn, the EGR cooler 44 cools the exhaust gases before re-circulating the exhaust gases back into the intake manifold 18. By adjusting the position of the EGR valve 42 the amount of exhaust gas re-circulated into the intake manifold 18 is controlled. The more the EGR valve 42 is opened, the more exhaust gas flows into the intake manifold 18. Conversely, the more the EGR valve 42 is closed, the less exhaust gas is re-circulated back into the intake manifold 18.

The recirculation of a portion of the exhaust gases back into the internal combustion engine 16 acts to dilute the amount of fresh air supplied by the air input runners 22 to the cylinders. By mixing the fresh air with gases that are inert to combustion, the exhaust gases act as absorbents of combustion generated heat and reduce peak temperatures within the cylinders. As a result, $NO_x$ emissions are typically reduced.

Although only a few embodiments of the invention have been described in detail, it should be appreciated that the invention may be implemented in many other forms without departing from the spirit or scope of the invention. Therefore, the present embodiments should be considered illustrative and not restrictive, and the invention is not to be limited to the details given herein but may be modified within the scope and equivalents of the appended claims.

What is claimed is:

1. A controller for controlling an engine having a plurality of cylinders, each cylinder having an associated intake valve and an associated exhaust valve, wherein the controller is configured to:

detect an exhaust valve actuation fault for a first exhaust valve of the exhaust valves during a first working cycle, the first exhaust valve being associated with a first cylinder;

in response to the detection of the exhaust valve actuation fault, direct fueling to be cut off to at least the first cylinder;

direct an attempt to actuate the first exhaust valve in a set of one or more engine cycles that follows the first working cycle, wherein the first cylinder is not fueled during the set of one or more engine cycles;

direct an electric motor to maintain at least one of a desired drive torque and a desired crankshaft rotation speed during the set of one or more engine cycles; and determine whether to resume operation of the first cylinder based at least in part on whether at least some of the attempts to actuate the first exhaust valve in the set of one or more engine cycles are successful.

2. A controller as recited in claim 1, wherein the electric motor is controlled to maintain at least a minimum engine speed during the attempt to actuate the first exhaust valve in the set of one or more engine cycles.

3. A controller, as recited in claim 1, wherein:

the engine is configured such that a set of the exhaust valves, including the first exhaust valve, are activated or deactivated as a group;

fuel is cut off to each of the cylinders in the group in response to the detection of the exhaust valve actuation fault; and the controller is further configured to direct an attempt to actuate the exhaust valves associated with each of the cylinders in the group, including the first cylinder during one or more engine cycles that follow the first working cycle wherein none of the cylinders in the group are fueled during the one or more engine cycles; and wherein the determination of whether to resume operation of the first cylinder is treated as a determination of whether to resume operation of all of the cylinders in the group.

4. A controller, as recited in claim 3, wherein the set of the exhaust valves comprises all of the exhaust valves of the engine.

5. A controller, as recited in claim 1, wherein the determination of whether the first exhaust valve actuated properly during the one or more working cycles is based at least in part on one or more of detected angular acceleration of a crankshaft, exhaust gas oxygen, detected exhaust manifold pressure, detected movement of exhaust valve by a proximity sensor, and detected intake manifold pressure (MAP).

6. A controller, as recited in claim 1, wherein the operating the engine uses a dynamic skip fire operation, wherein the dynamic skip fire operation removes the first cylinder from all skip fire sequences as a result of detecting the exhaust valve actuation fault and adds the first cylinder to skip fire sequences on the resuming operation of the first cylinder.

7. A controller, as recited in claim 1, further configured to allow a violation of state of charge and/or current draw limits, while using the electric motor to power the engine when fuel is cut to at least the first cylinder.

8. A system comprising:

an engine;

an electric motor; and a controller as recited in claim 1.

9. A method of operating an engine having a plurality of working chambers, each working chamber having an associated intake valve and an associated exhaust valve, the method comprising:

detecting an exhaust valve actuation fault for a first exhaust valve of the exhaust valves during a first working cycle, the first exhaust valve being associated with a first one of the working chambers;

in response to the detection of the exhaust valve actuation fault, cutting off fueling to at least the first working chamber;

attempting to actuate the first exhaust valve in a set of one or more second working cycles that follows the first working cycle in the first working chamber, wherein the one or more second working cycles are not fueled;

for each of the one or more second working cycles, determining whether the first exhaust valve actuated properly during the set of one or more second working cycles;

resuming operation of the first working chamber when it is determined that the first exhaust valve actuated properly during the set of one or more second working cycles; and not resuming operation of the first working chamber when it is determined that the first exhaust valve did not actuate properly during the set of one or more second working cycles.

* * * * *